United States Patent
Dichiu et al.

(10) Patent No.: US 9,130,778 B2
(45) Date of Patent: Sep. 8, 2015

(54) SYSTEMS AND METHODS FOR SPAM DETECTION USING FREQUENCY SPECTRA OF CHARACTER STRINGS

(75) Inventors: Daniel Dichiu, Bucharest (RO); Lucian Z Lupsescu, Bucharest (RO)

(73) Assignee: Bitdefender IPR Management Ltd., Nicosia (CY)

( * ) Notice: Subject to any disclaimer, the term of this patent is extended or adjusted under 35 U.S.C. 154(b) by 668 days.

(21) Appl. No.: 13/358,338

(22) Filed: Jan. 25, 2012

(65) Prior Publication Data

US 2013/0191468 A1  Jul. 25, 2013

(51) Int. Cl.
  *G06F 15/16* (2006.01)
  *H04L 12/58* (2006.01)

(52) U.S. Cl.
  CPC .................... *H04L 12/585* (2013.01)

(58) Field of Classification Search
  USPC .......... 709/203, 206, 216–219, 223–225, 232
  See application file for complete search history.

(56) References Cited

U.S. PATENT DOCUMENTS

| | | | |
|---|---|---|---|
| 5,418,951 A | 5/1995 | Damashek | |
| 5,828,999 A | 10/1998 | Bellegarda et al. | |
| 6,732,149 B1 * | 5/2004 | Kephart | 709/206 |
| 7,529,719 B2 | 5/2009 | Liu et al. | |
| 7,555,523 B1 | 6/2009 | Hartmann | |
| 7,751,620 B1 | 7/2010 | Cosoi | |
| 8,001,195 B1 | 8/2011 | Kalinin | |
| 8,019,704 B1 | 9/2011 | Tong et al. | |
| 8,156,063 B1 | 4/2012 | Rahmouni et al. | |
| 2003/0167402 A1 * | 9/2003 | Stolfo et al. | 713/200 |
| 2003/0204569 A1 * | 10/2003 | Andrews et al. | 709/206 |
| 2005/0041789 A1 | 2/2005 | Warren-Smith et al. | |
| 2005/0193073 A1 | 9/2005 | Mehr et al. | |
| 2006/0015564 A1 | 1/2006 | Angelica | |

(Continued)

FOREIGN PATENT DOCUMENTS

WO  0219069  3/2002

OTHER PUBLICATIONS

Ukkonen, "Approximate string-matching with q-grams and maximal matches," Theoretical Computer Science 92 (1992), p. 191-211, Department of Computer Science, University of Helsinki, Helsinki, Finland. Jan. 6, 1992.

(Continued)

*Primary Examiner* — Brian J Gillis
*Assistant Examiner* — Thao Duong
(74) *Attorney, Agent, or Firm* — Law Office of Andrei D Popovici, PC

(57) ABSTRACT

Described spam detection techniques including string identification, pre-filtering, and frequency spectrum and timestamp comparison steps facilitate accurate, computationally-efficient detection of rapidly-changing spam arriving in short-lasting waves. In some embodiments, a computer system extracts a target character string from an electronic communication such as a blog comment, transmits it to an anti-spam server, and receives an indicator of whether the respective electronic communication is spam or non-spam from the anti-spam server. The anti-spam server determines whether the electronic communication is spam or non-spam according to features of the frequency spectrum of the target string. Some embodiments also perform an unsupervised clustering of incoming target strings into clusters, wherein all members of a cluster have similar spectra.

29 Claims, 10 Drawing Sheets

(56) References Cited

U.S. PATENT DOCUMENTS

| | | | |
|---|---|---|---|
| 2006/0031346 A1* | 2/2006 | Zheng et al. | 709/206 |
| 2006/0089924 A1 | 4/2006 | Raskutti et al. | |
| 2006/0095521 A1 | 5/2006 | Patinkin | |
| 2006/0149820 A1 | 7/2006 | Rajan et al. | |
| 2007/0027992 A1 | 2/2007 | Judge et al. | |
| 2008/0133682 A1 | 6/2008 | Chadwick et al. | |
| 2008/0301809 A1 | 12/2008 | Choi | |
| 2008/0319995 A1 | 12/2008 | Alspector et al. | |
| 2009/0024555 A1 | 1/2009 | Rieck et al. | |
| 2009/0089220 A1* | 4/2009 | Ciabattoni | 705/36 R |
| 2009/0132669 A1* | 5/2009 | Milliken et al. | 709/206 |
| 2009/0220166 A1* | 9/2009 | Choi et al. | 382/260 |
| 2010/0017487 A1* | 1/2010 | Patinkin | 709/206 |
| 2010/0074528 A1 | 3/2010 | Hu et al. | |
| 2010/0082749 A1 | 4/2010 | Wei et al. | |
| 2010/0246960 A1 | 9/2010 | Kim | |
| 2010/0333200 A1 | 12/2010 | Chen et al. | |
| 2011/0202620 A1 | 8/2011 | Wang | |
| 2012/0150967 A1* | 6/2012 | Cai et al. | 709/206 |
| 2012/0215853 A1 | 8/2012 | Sundaram et al. | |
| 2012/0278388 A1 | 11/2012 | Kleinbart et al. | |
| 2013/0071005 A1* | 3/2013 | Tao et al. | 382/139 |
| 2013/0179166 A1 | 7/2013 | Fujibayashi | |

OTHER PUBLICATIONS

Cavnar et al., "N-Gram-Based Text Categorization," p. 1-14, Proceedings of SDAIR-94, 3rd Annual Symposium on Document Analysis and Information Retrieval, Environmental Research Institute of Michigan, Ann Arbor, MI. Apr. 11-13, 1994.

Arneodo et al., "Characterizing Long-Range Correlations in DNA Sequences from Wavelet Analysis," Physical Review Letters, vol. 74, nr. 16, pp. 3293-3296, The American Physical Society, College Park, MD. Apr. 17, 1995.

Porter et al., "Approximate String Comparison and its Effect on an Advanced Record Linkage System," p. 1-10, Proceedings of an International Workshop and Exposition. Federal Committee on Statistical Methodology—Working Papers, U.S. Bureau of the Census, Washington, DC. Mar. 20-21, 1997.

Martin et al., "Algorithms for bigram and trigram word clustering," Speech Communication 24 (1998) pp. 19-37, RWTH Aachen University, Aachen, Germany. 1998; the year of publication is sufficiently earlier than the effective U.S. filed and any foreign priority date so that the particular month of publication is not in issue.

Anastassiou, "Frequency-domain analysis of biomolecular sequences," Bioinformatics, vol. 16, nr. 12, pp. 1073-1081, Department of Electrical Engineering, Columbia University, New York, NY. Jul. 2000.

Cristea, "Conversion of nucleotides sequences into genomic signals," Journal of Cellular and Molecular Medicine, vol. 6, nr. 2, pp. 279-303. University of Bucharest, Romania, Bucharest, Romania. Apr. 2002.

Chen et al., "Fast Semi-local Alignment for DNA Sequence Database Search," Proceedings of the 16th International Conference on Pattern Recognition, Quebec, Canada, vol. 3, pp. 1019-1022, National Taiwan University, Taipei, Taiwan. Aug. 2002.

Nair, "Are categorical periodograms and indicator sequences of genomes spectrally equivalent?" p. 1-10, In Silico Biology vol. 6, 0019, University of Kerala, India, Thiruvananthapuram, India. May 20, 2006.

Chapman, "String Similarity Metrics for Information Integration," p. 1-11, Natural Language Processing Group, Department of Computer Science, University of Sheffield, Sheffield, United Kingdom, available at http://web.archive.org/web/20081224234350/http://www.dcs.shef.ac.uk/~sam/stringmetrics.html, archive.org indicates document was online on Dec. 24, 2008.

Romulus, "Using Time-Frequency Representations and Hough Transform to Genomic Signal Processing," Acta Electrotehnica, vol. 50, nr 1, pp. 57-62, Mediamira Science Publisher, Cluj-Napoca, Romania. 2009; the year of publication is sufficiently earlier than the effective U.S. filing date and any foreign priority date so that the particular month of publication is not in issue.

Saxena et al., "Identification of DNA Sequences by Applications of Signal Processing Tools in Protein-Coding Regions," International Journal of Electronic Engineering Research, vol. 2, nr. 4, pp. 497-506, Research India Publication, Delhi, India. Sep. 20, 2010.

Dichiu, U.S. Appl. No. 13/358,358, filed Jan. 25, 2012.

United States Patent and Trademark Office (USPTO), Office Action Mailed Jan. 27, 2014 for U.S. Appl. No. 13/358,358, filed Jan. 25, 2012.

United States Patent and Trademark Office (USPTO), Office Action Mailed Aug. 14, 2013 for U.S. Appl. No. 13/358,358, filed Jan. 25, 2012.

Arslan et al., "Efficient Algorithms for Normalized Edit Distance," Hermes Science Publications, Journal of Discrete Algorithms, vol. 0 No. 0, p. 1-18, Nov. 15, 1999.

Escalante et al., "Local Histograms of Character N-grams for Authorship Attribution," Proceedings of the 49th Annual Meeting of the Association for Computational Linguistics, p. 288-298, Portland, Oregon, Jun. 19-24, 2011.

Hershkop, "Behavior-based Email Analysis with Application to Spam Detection," Columbia University, p. 40-153, 2006, the year of publication is sufficiently earlier than the effective U.S. filing date and any foreign priority date so that the particular month of publication is not in issue.

Marzal et al., "Computation of Normalized Edit Distance and Applications," IEEE Transactions on Pattern Analysis and Machine Intelligence, vol. 15 No. 9, p. 1-7, Sep. 1993.

Salcedo-Campos et al., "Segmental parameterisation and statistical modelling of e-mail headers for spam detection," Dept. of Signal Theory Telematics and Communications ETSIIT CITIC, University of Granada, Granada, Spain, p. 2-18, Jan. 24, 2012.

European Patent Office (ISA), International Search Report and Written Opinion Mailed Jun. 6, 2013 for International Application No. PCT/RO2012/000022, international filed Sep. 5, 2012.

European Patent Office (ISA), International Search Report and Written Opinion Mailed Jun. 5, 2013 for International Application No. PCT/RO2012/000023, international filed Sep. 5, 2012.

\* cited by examiner

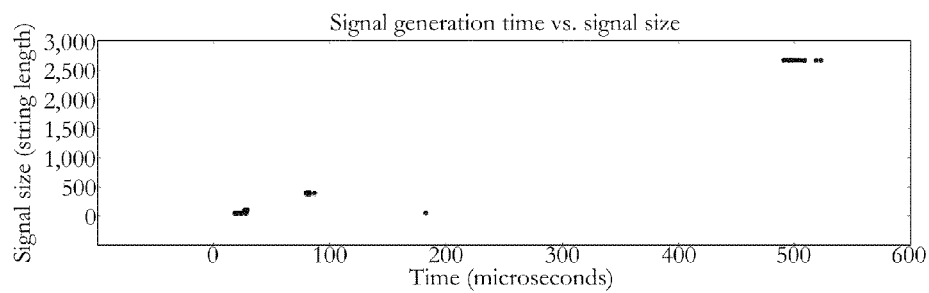
FIG. 10-A
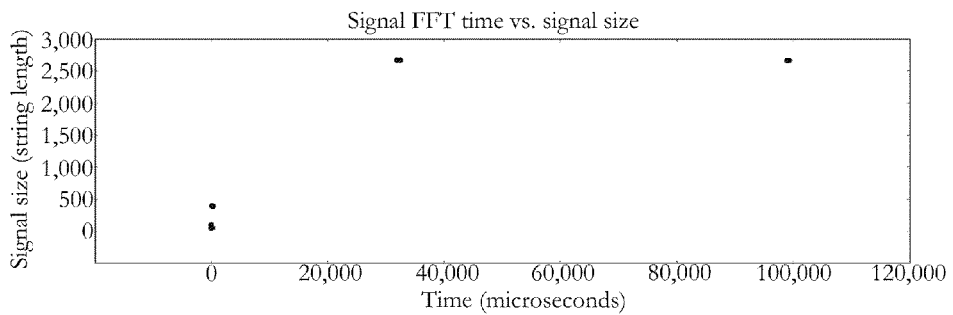
FIG. 10-B
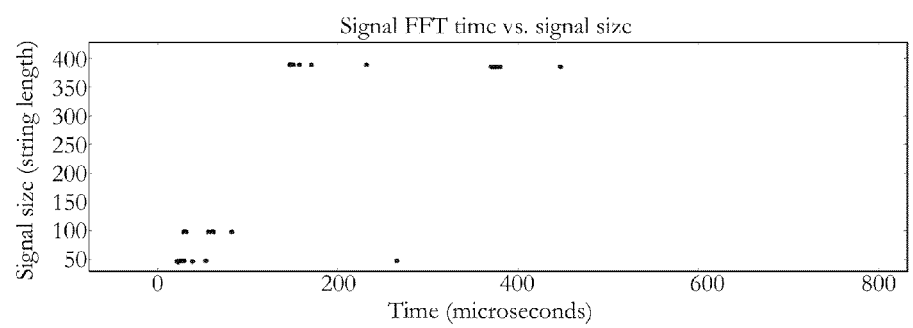
FIG. 10-C

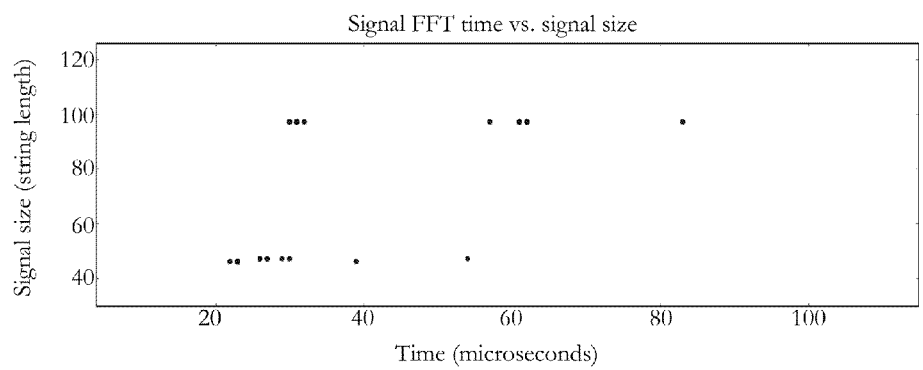
FIG. 10-D
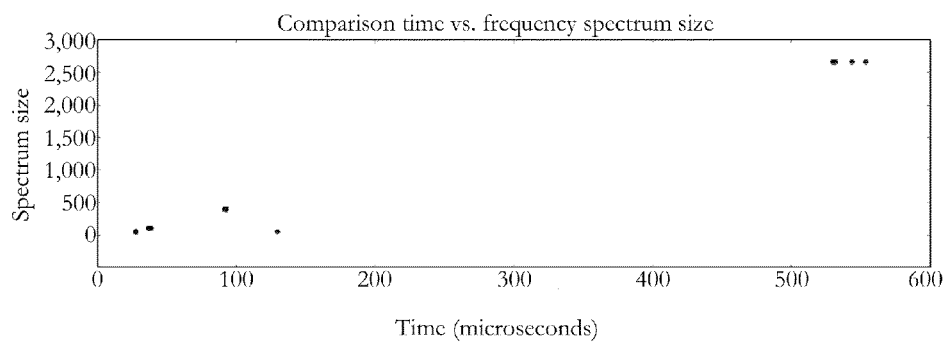
FIG. 10-E

SYSTEMS AND METHODS FOR SPAM DETECTION USING FREQUENCY SPECTRA OF CHARACTER STRINGS

BACKGROUND

The invention relates to methods and systems for classifying electronic communications, and in particular to systems and methods for filtering unsolicited commercial electronic communications (spam).

Unsolicited commercial electronic communications, also known as spam, form a significant portion of all communication traffic worldwide, affecting both computer and telephone messaging services. Spam may take many forms, from unsolicited email communications, to spam messages masquerading as user comments on various Internet sites such as blogs and social network sites. Spam takes up valuable hardware resources, affects productivity, and is considered annoying and intrusive by many users of communication services and/or the Internet.

In the case of email spam, software running on a user's or email service provider's computer system may be used to classify email messages as spam or non-spam, and even to discriminate between various kinds of spam messages (e.g., product offers, adult content, email scams). Spam messages can then be directed to special folders or deleted.

Similarly, software running on a content provider's computer systems may be used to intercept fraudulent messages posted to a website and prevent the respective messages from being displayed, or to display a warning to the users of the website that the respective messages may be spam.

Several approaches have been proposed for identifying spam messages, including matching the message's originating address to lists of known offending or trusted addresses (techniques termed black- and white-listing, respectively), searching for certain words or word patterns (e.g. refinancing, Viagra®, stock), and analyzing message headers. Feature extraction/matching methods are often used in conjunction with automated data classification methods (e.g., Bayesian filtering, neural networks).

Spam often arrives in a rapid succession of groups of similar messages also known as spam waves. The form and content of spam may change substantially from one spam wave to another, therefore successful detection may benefit from methods and systems capable of quickly recognizing and reacting to new spam waves.

SUMMARY

According to one aspect, a method comprises: employing a computer system to receive a target string forming a part of an electronic communication; processing the target string into a target signal consisting of a sequence of numbers, wherein each character of the target string is mapped to a number of the sequence of numbers; determining a string eligibility criterion according to the target string; and pre-filtering a corpus of reference strings according to the string eligibility criterion, to produce a plurality of candidate strings. In response to selecting the candidate strings, the computer system is further employed perform a comparison between a frequency spectrum of the target signal and a frequency spectrum determined for a candidate string of the plurality of candidate strings, and to determine whether the electronic communication is spam or non-spam according to a result of the comparison.

According to another aspect, a computer system comprises at least a processor programmed to: receive a target string forming a part of an electronic communication; process the target string into a target signal consisting of a sequence of numbers, wherein each character of the target string is mapped to a number of the sequence of numbers; in response to receiving the target string, determine a string eligibility criterion according to the target string; and pre-filter a corpus of reference strings according to the string eligibility criterion, to produce a plurality of candidate strings. The processor is further programmed to perform a comparison between a frequency spectrum of the target signal and a frequency spectrum determined for a candidate string of the plurality of candidate strings, and to determine whether the electronic communication is spam or non-spam according to a result of the comparison.

According to another aspect, a method comprises: employing a computer system to receive an electronic communication; extracting a target string from the electronic communication; transmitting the target string to an anti-spam server; and receiving a target label indicative of whether the electronic communication is spam or non-spam, wherein the target label is determined at the anti-spam server. Determining the target label comprises: employing the anti-spam server to process the target string of characters into a target signal consisting of a sequence of numbers, wherein each character of the target string is mapped to a number of the sequence of numbers; determining an eligibility criterion according to the target string; pre-filtering a corpus of reference strings according to the eligibility criterion, to produce a plurality of candidate strings; in response to selecting the candidate strings, performing a comparison between a frequency spectrum of the target signal and a frequency spectrum determined for a candidate string of the plurality of candidate strings; determining whether the electronic communication is spam or non-spam according to a result of the comparison.

According to one aspect, a method comprises: employing a computer system to receive a target string forming a part of an electronic communication; processing the target string into a target signal consisting of a sequence of numbers, wherein each character of the target string is mapped to a number of the sequence of numbers; determining a string eligibility criterion according to the target string; and pre-filtering a corpus of reference strings according to the string eligibility criterion, to produce a plurality of candidate strings. In response to selecting the candidate strings, the computer system is further employed to determine an inter-string distance separating the target string from a candidate string of the plurality of candidate strings, the inter-string distance determined according to a first amplitude of a frequency spectrum of the target signal and according to a second amplitude of a frequency spectrum determined for the candidate string, and to determine whether the electronic communication is spam or non-spam according to a result of the comparison.

According to another aspect, a method comprises: employing a computer system to receive a target string forming a part of an electronic communication; processing the target string into a target signal consisting of a sequence of numbers, wherein each character of the target string is mapped to a number of the sequence of numbers; and determining a frequency spectrum of the target signal. The method further comprises performing a comparison between the frequency spectrum of the target signal and a frequency spectrum determined for a reference string selected from a set of reference strings, and determining whether the target communication is spam or non-spam according to a result of the comparison.

BRIEF DESCRIPTION OF THE DRAWINGS

The foregoing aspects and advantages of the present invention will become better understood upon reading the following detailed description and upon reference to the drawings where:

FIG. 3-B illustrates an exemplary spam detection transaction between a content server and an anti-spam server, according to some embodiments of the present invention.

FIG. 10-A shows a result of a computer experiment, comprising determining computation time taken to convert target strings into target signals, as a function of the string length of the test strings.

FIG. 10-B-C-D show results of a computer experiment, comprising determining computation time to generate target spectra for a collection of target strings, as a function of the string length of the test strings.

FIG. 10-E shows a result of a computer experiment, comprising determining computation time taken to perform cluster assignment for a collection of test strings, as a function of the number of distinct characters of the test strings.

DETAILED DESCRIPTION OF PREFERRED EMBODIMENTS

In the following description, it is understood that all recited connections between structures can be direct operative connections or indirect operative connections through intermediary structures. A set of elements includes one or more elements. Any recitation of an element is understood to refer to at least one element. A plurality of elements includes at least two elements. Unless otherwise required, any described method steps need not be necessarily performed in a particular illustrated order. A first element (e.g. data) derived from a second element encompasses a first element equal to the second element, as well as a first element generated by processing the second element and optionally other data. Making a determination or decision according to a parameter encompasses making the determination or decision according to the parameter and optionally according to other data. Unless otherwise specified, an indicator of some quantity/data may be the quantity/data itself, or an indicator different from the quantity/data itself. Computer programs described in some embodiments of the present invention may be stand-alone software entities or sub-entities (e.g., subroutines, code objects) of other computer programs. Unless otherwise specified, the term spam is not limited to email spam, but also encompasses electronic communications such as non-legitimate or unsolicited commercial user-generated content in the form of blog comments, forum discussions, wiki entries, customer feedback, posts on social network sites, instant messages, as well as phone text and multimedia messages, among others. Computer readable media encompass non-transitory storage media such as magnetic, optic, and semiconductor media (e.g. hard drives, optical disks, flash memory, DRAM), as well as communications links such as conductive cables and fiber optic links. According to some embodiments, the present invention provides, inter alia, computer systems comprising hardware programmed to perform the methods described herein, as well as computer-readable media encoding instructions to perform the methods described herein.

The following description illustrates embodiments of the invention by way of example and not necessarily by way of limitation.

Figure 1:
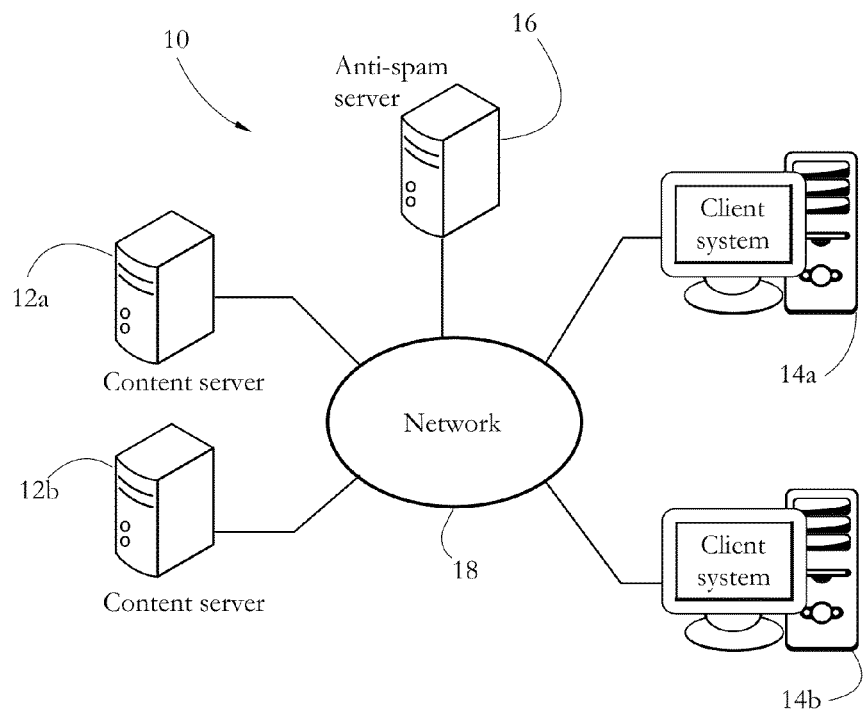
FIG. 1 shows an exemplary anti-spam system according to some embodiments of the present invention.

FIG. 1 shows an exemplary anti-spam system according to some embodiments of the present invention. System 10 includes a plurality of content servers 12a-b, an anti-spam server 16, and a plurality of client systems 14a-b. Content servers 12a-b may represent webservers hosting and/or delivering online content such as personal and corporate websites, blogs, social network sites, and online entertainment sites, among others. Other content servers 12a-b may represent email servers providing electronic message delivery to client systems 14a-b. Client systems 14a-b may represent end-user computers, each having a processor, memory, and storage, and running an operating system such as Windows®, MacOS® or Linux. Some client computer systems 14a-b may represent mobile computing and/or telecommunication devices such as tablet PCs, mobile telephones, and personal digital assistants (PDA). In some embodiments, client systems 14a-b may represent individual customers, or several client systems may belong to the same customer. Anti-spam server 16 may include one or more computer systems. A network 18 connects content servers 12a-b, client systems 14a-b, and anti-spam server 16. Network 18 may be a wide-area network such as the Internet, while parts of network 18 may also include a local area network (LAN).

Figure 2:
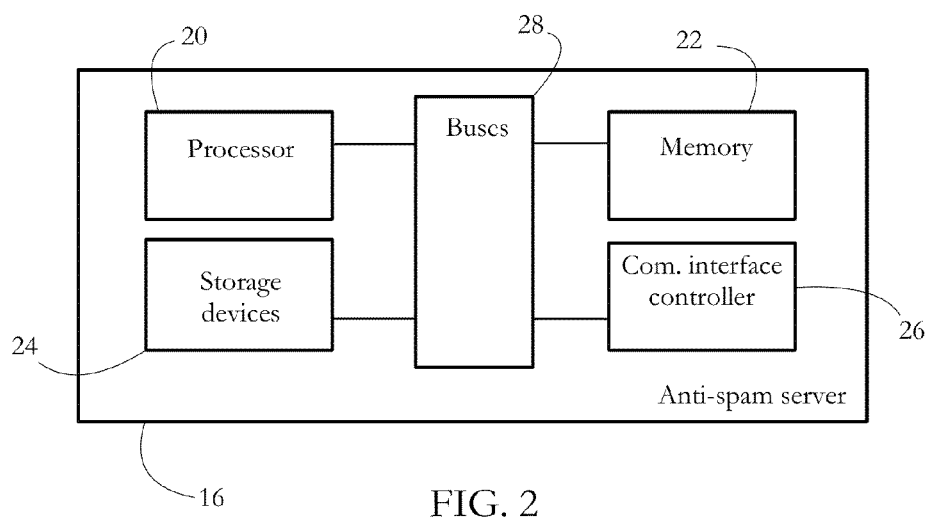
FIG. 2 shows an exemplary hardware configuration of a server computer system according to some embodiments of the present invention.

FIG. 2 shows an exemplary hardware configuration of a server computer system such as anti-spam server 16. In some embodiments, server 16 comprises a processor 20, a memory unit 22, a set of storage devices 24, and a communication interface controller 26, all connected by a set of buses 28.

In some embodiments, processor 20 comprises a physical device (e.g. multi-core integrated circuit) configured to execute computational and/or logical operations with a set of signals and/or data. In some embodiments, such logical operations are delivered to processor 20 in the form of a sequence of processor instructions (e.g. machine code or other type of software). Memory unit 22 may comprise computer-readable media (e.g. RAM) storing data/signals accessed or generated by processor 20 in the course of carrying out instructions. Storage devices 24 include computer-readable media enabling the non-volatile storage, reading, and writing of software instructions and/or data. Exemplary storage devices 24 include magnetic and optical disks and semiconductor (e.g., flash) memory devices, as well as removable media such as CD and/or DVD disks and drives. Communication interface controller 26 enables server system 16 to connect to network 18 and/or to other machines/computer systems. Typical communication interface controllers 26 include network adapters. Buses 28 collectively represent the plurality of system, peripheral, and chipset buses, and/or all other circuitry enabling the inter-communication of devices 20-26 of server system 16. For example, buses 28 may comprise the northbridge bus connecting processor 20 to memory 22, and/or the southbridge bus connecting processor 20 to devices 24-26, among others.

In some embodiments, each client system 14a-b comprises a document reader application (e.g. web browser, email reader, media player), which may be a computer program used to remotely access data stored on content servers 12a-b. When a user accesses an online document such as a webpage, or receives an electronic communication such as email, data associated to the document/communication circulates on parts of network 18 between the respective content server and client system 14. In some embodiments, the reader application receives the document data, translates it into visual form and displays it to the user. Some embodiments of reader application may also allow the user to interact with the displayed content. In the case of email, client system 14a-b may include specialized software configured to classify incoming email into one of a plurality of categories (e.g, spam, legitimate, various other classes and subclasses).

In some embodiments, content servers 12a-b are configured to receive user-generated content (e.g. articles, blog entries, media uploads, comments etc.) from a plurality of users, and to organize, format, and deliver such content to third parties over network 18. A portion of user-generated data received at servers 12a-b may comprise electronic communications which may include unsolicited messages (spam). Examples of such electronic communications (referred to as target communications or target messages in the following description) are email messages, blog comments, posts to social networking sites, and comments sent to entertainment and/or news websites, among others.

In some embodiments, content servers 12a-b may comprise software components configured to process target communications received from users, to detect spam. When detected, spam messages (e.g., fraudulent blog comments, etc.), may be blocked and/or prevented from being displayed within the respective website. Spam-processing software may be implemented on content servers 12a-b in the form of server-side scripts. Such scripts may be incorporated as plugins into larger script packages, e.g. as anti-spam plugin(s) for the Wordpress® or Drupal® online publishing platforms. In some embodiments, to detect spam, servers 12a-b may be configured to engage in a collaborative spam-detection transaction with anti-spam server 16, as described in detail below.

Figure 3A:
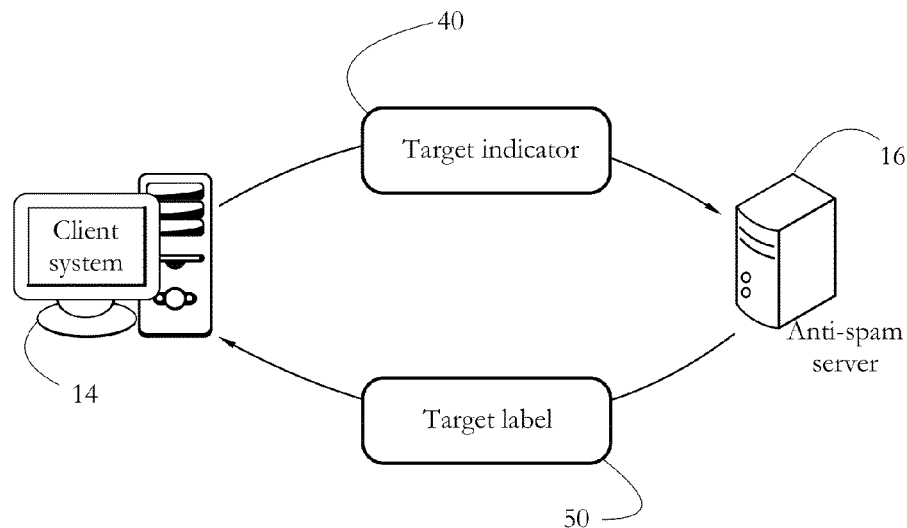
FIG. 3-A illustrates an exemplary spam detection transaction between a client computer and an anti-spam server, according to some embodiments of the present invention.
Figure 3B:
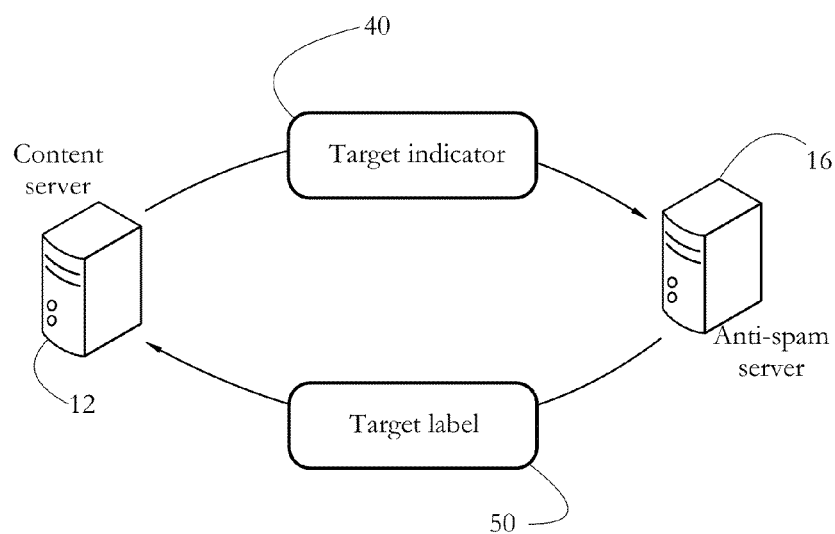

In some embodiments, anti-spam server 16 is configured to perform a collaborative spam-detection transaction with content servers 12a-b and/or client systems 14a-b. FIG. 3-A illustrates an exemplary data exchange between server 16 and a client system 14, in an embodiment configured to detect email spam. Client system 14 may receive email messages from a mail server over network 18. After receiving an email message, client system 14 may send a target indicator 40 comprising spam-identifying data associated to the email message to anti-spam server 16, and may receive in response a target label 50 indicative of whether the respective email message is spam. Client system 14 may subsequently place the message in an appropriate message category (e.g. spam or legitimate email).

FIG. 3-B illustrates an exemplary data exchange between anti-spam server 16 and a content server 12, in an embodiment configured to detect user-generated spam received at server 12, such as blog spam or spam posted on social network sites, among others. After receiving a target communication, e.g., as a result of a user posting a comment on a website hosted on server 12, server 12 may send target indicator 40 comprising spam-identifying data extracted from the target communication to anti-spam server 16, and in response receive target label 50 indicating whether the target communication is spam.

Figure 4:
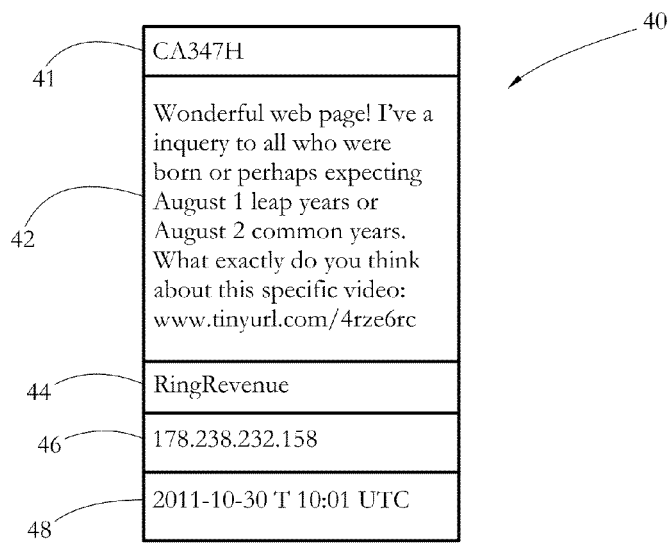
FIG. 4 shows an exemplary target indicator of a target communication, the indicator comprising a target string and additional spam-identifying data, according to some embodiments of the present invention.

FIG. 4 shows an exemplary target indicator of a target communication, according to some embodiments of the present invention. Target indicator 40 comprises an object ID 41 (e.g., label, hash) uniquely identifying the target communication, and a target string 42 including a text part of the target communication, such as a text part of a blog comment. In some embodiments, target string 42 comprises substantially all the text of the target communication. When the target communication includes several text parts, target string 42 may comprise a concatenation of text parts; alternatively, each text part may receive a distinct target string 42. In some embodiments, target string 42 comprises a section of the text part of the target communication, the section having a pre-set string length (e.g., 128 consecutive characters).

Some embodiments of target indicator 40 may include other spam-identifying data corresponding to the target communication, beside target string 42. In the example of FIG. 4, target indicator 40 includes a username indicator 44 indicative of a name (e.g., personal name, pseudonym, screen name, login name, avatar name, handle, etc.) provided by the submitter of the target communication, an address indicator 46 indicative of a location of origin (e.g. originating IP address) of the target communication, and a time stamp 48 indicative of a point in real time (e.g. date and time) when the target communication was submitted.

In some embodiments, target label 50 may comprise an object ID such as ID 41, and an indicator of the spam status of the target communication. Target label 50 effectively specifies whether the target communication is spam, according to the assessment performed by anti-spam server 16, as described in detail below.

Figure 5:
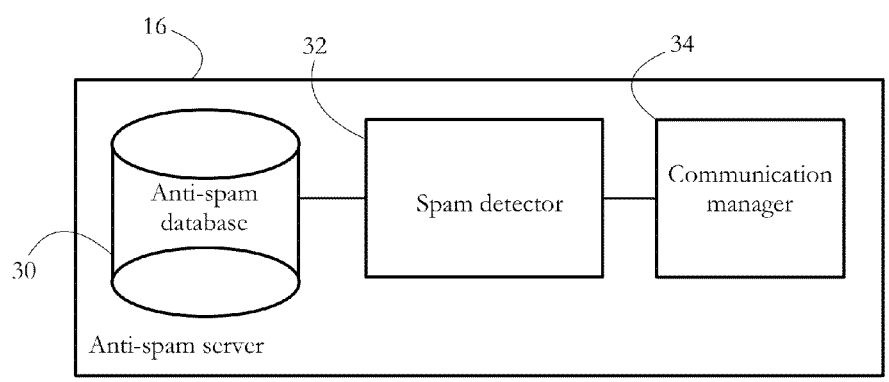
FIG. 5 shows a diagram of an exemplary set of applications executing on an anti-spam server according to some embodiments of the present invention.

FIG. 5 shows a diagram of an exemplary set of applications executing on anti-spam server 16 according to some embodiments of the present invention. Applications include a spam detector 32 and a communication manager 34 connected o spam detector 32. Applications 32 and 34 may be standalone computer programs, or may form part of larger software suites providing, for example, computer security services such as malware detection. In some embodiments, anti-spam server 16 also hosts an anti-spam database 30. Alternatively, anti-spam database may reside on a computer system distinct from server 16, but connected to server 16 via network 18, or on computer-readable media connected to server 16.

Anti-spam database 30 comprises a repository of knowledge related to online spam. In some embodiments, database 30 comprises a corpus of reference spectra, each spectrum calculated for an electronic communication as described further below. Database 30 may include data for both spam or non-spam electronic communications such as blog comments, comments posted on social network sites, etc. Beside spectrum data, each record stored in database 30 may include additional information, such as string 42 of the respective communication, a time indicator such as time stamp 48, and indicators of string length, number of distinct characters and spectrum score of string 42; exemplary uses of such quantities are described below. In some embodiments, in relation to each spectrum, database 30 may store a cluster assignment indicator indicative of a cluster of messages the respective string is currently assigned to. Database 30 may also store a data structure comprising a plurality of identifiers such as object ID 41, each object identifier uniquely associated to an electronic communication, and a mapping associating each spectrum with the electronic communication it was calculated for, allowing spam detector 32 to selectively retrieve reference spectra from database 30, as shown below.

Figure 6:
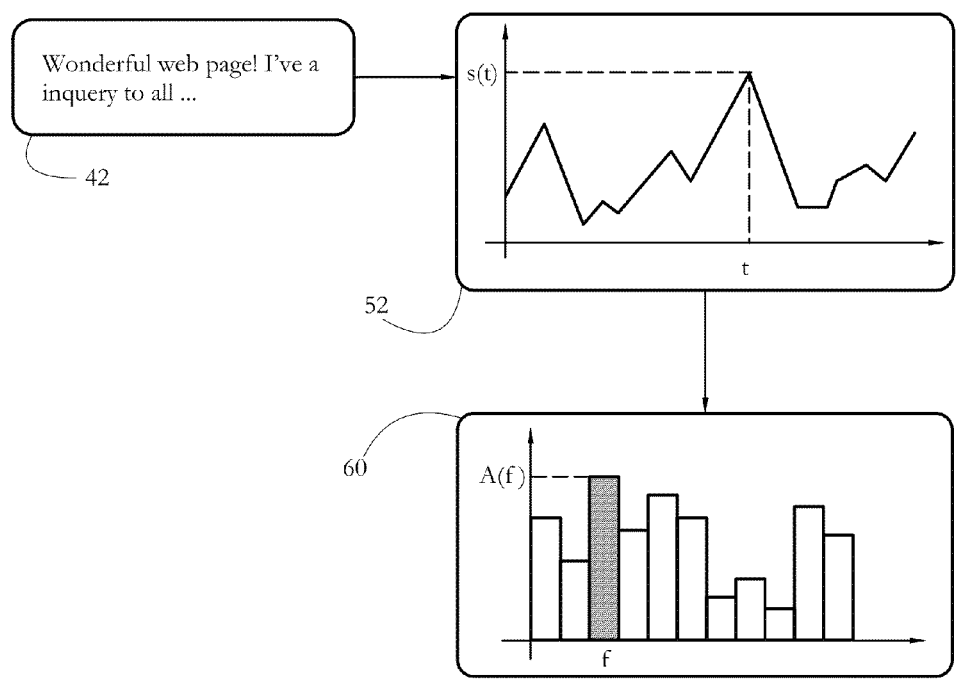
FIG. 6 shows an exemplary target signal and an exemplary target spectrum associated to a target string, according to some embodiments of the present invention.

FIG. 6 shows an exemplary target signal and an exemplary target spectrum computed for target string 42 according to some embodiments of the present invention. Target signal 52 comprises a sequence of numbers, each number indicative of a character of string 42. To produce target signal 52, a one-to-one correspondence (i.e., bijective function) mapping characters to numbers may be used. In some embodiments, for each character of string 42, target signal 52 comprises the ASCII code for the respective character.

Target spectrum 60 comprises a sequence of numbers, the sequence representing a frequency domain (e.g., Fourier transform) representation of target signal 52. In some embodiments, a position of a selected number within the sequence is indicative of a frequency f, whereas the number itself $A(f)$ may be indicative of an amplitude or of a power of the respective frequency component of signal 52. In some embodiments, a discrete Fourier transform (DFT) algorithm such as the fast Fourier transform (FFT) is used to compute target spectrum 60 from target signal 52.

In some embodiments, communication manager 34 is configured to manage communication with client systems 14*a-b* and/or content servers 12*a-b*. For example, manager 34 may establish connections over network 18, send and receive data such as target indicators and target labels to/from client systems 14*a-b*, and content servers 12*a-b*.

Figure 7:
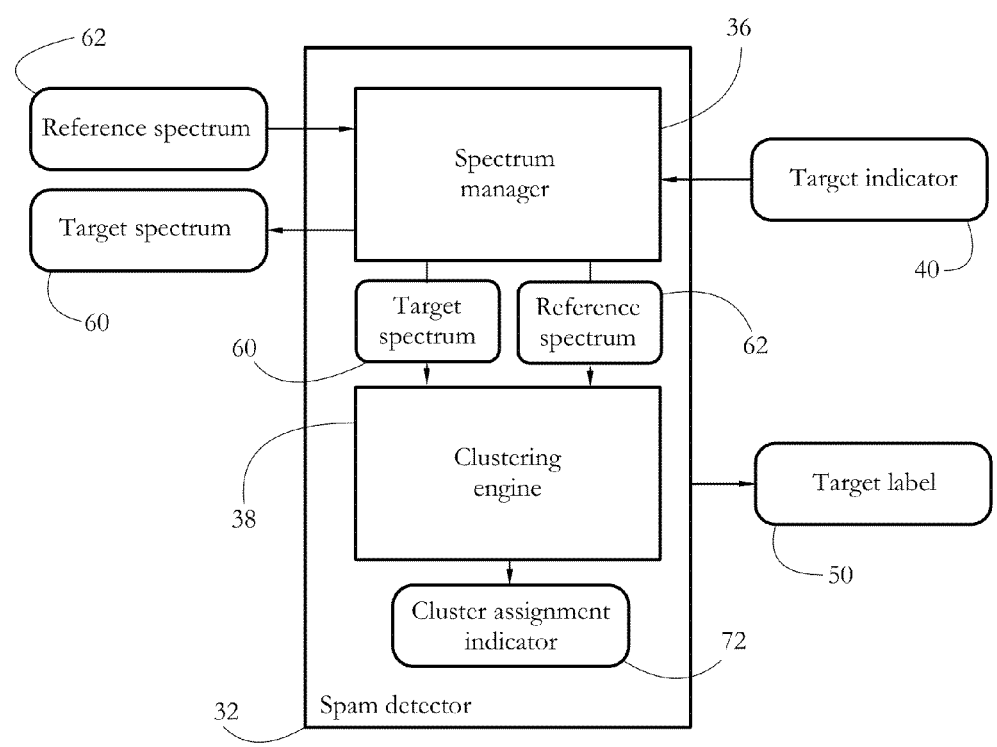
FIG. 7 illustrates an exemplary spam detector application operating on the anti-spam server of FIG. 1, according to some embodiments of the present invention.

FIG. 7 shows a diagram of an exemplary spam detector operating on anti-spam server 16 according to some embodiments of the present invention. Spam detector 32 comprises a spectrum manager 36 and a clustering engine 38 connected to spectrum manager 36. Spam detector 32 may receive target indicator 40 of a target communication from communication manager 34 (see FIGS. 5 and 3*a-b*) and a reference spectrum 64 from anti-spam database 30, and in turn outputs target label 50 to communication manager 34, to be forwarded to client system 14 or content server 12 which initiated the respective spam-detection transaction.

In some embodiments, spectrum manager 36 is configured to receive target indicator 40 from communication manager 34, to compute target spectrum 60 from data of target indicator 40, to perform a pre-filtering process to determine a set of eligible reference spectra 64, to selectively retrieve reference spectra 64 from anti-spam database 30, and to forward spectra 60 and 64 to clustering engine 38 for spectrum comparison and cluster assignment. The operation of spectrum manager 36 will be discussed in detail in relation to FIG. 9.

Figure 8:
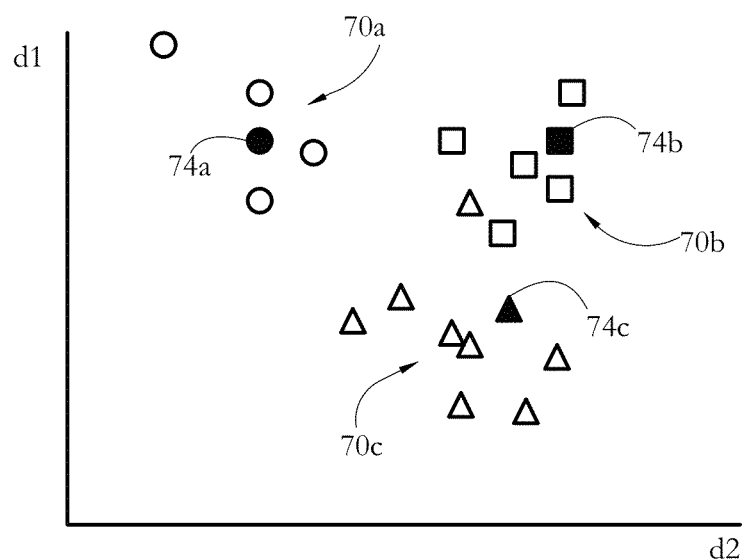
FIG. 8 illustrates a plurality of clusters, each cluster comprising a collection of similar items, represented in a feature hyperspace according to some embodiments of the present invention.

In some embodiments, target message analysis is performed in a feature hyperspace, by analyzing distances between a feature vector corresponding to a target communication and a set of representative vectors, each representative vector defining a prototype of a distinct collection (cluster) of target strings. FIG. 8 shows three exemplary clusters 70*a-c* formed by feature vectors 74*a-c*, respectively, in a simple 2-D feature space having two axes, d1 and d2. In some embodiments of the present invention, axes d1 and d2 correspond to distinct features of a target string, such as two distinct frequencies of the target spectrum. In some embodiments, each cluster 70 consists of target strings which occupy a substantially small region of feature hyperspace, meaning that all members of a cluster have similar feature vectors, e.g., similar frequency spectra.

In some embodiments, clustering engine 38 is configured to maintain a collection of clusters 70, representing a corpus of electronic communications received at anti-spam server 16 during a history of data accumulation. Communications are grouped into clusters according to similarity; ideally, a cluster consists of identical or nearly-identical messages. Some clusters 70 may represent individual spam waves, each including copies or variants of the same spam message sent to a multitude of clients and/or posted on a multitude of websites. Clustering engine 38 is further configured to receive target spectrum 60 and to assign the target communication represented by spectrum 60 to a cluster that it is most similar to, according to spectrum similarity. To perform cluster assignment, clustering engine 38 receives a set of reference spectra 64 from spectrum manager 36, each spectrum 64 representative of a cluster, and compares spectra 60 and 64 to determine which message cluster best matches target spectrum 60. More details of the operation of clustering engine 38 are given below, in relation to FIG. 9.

Figure 9:
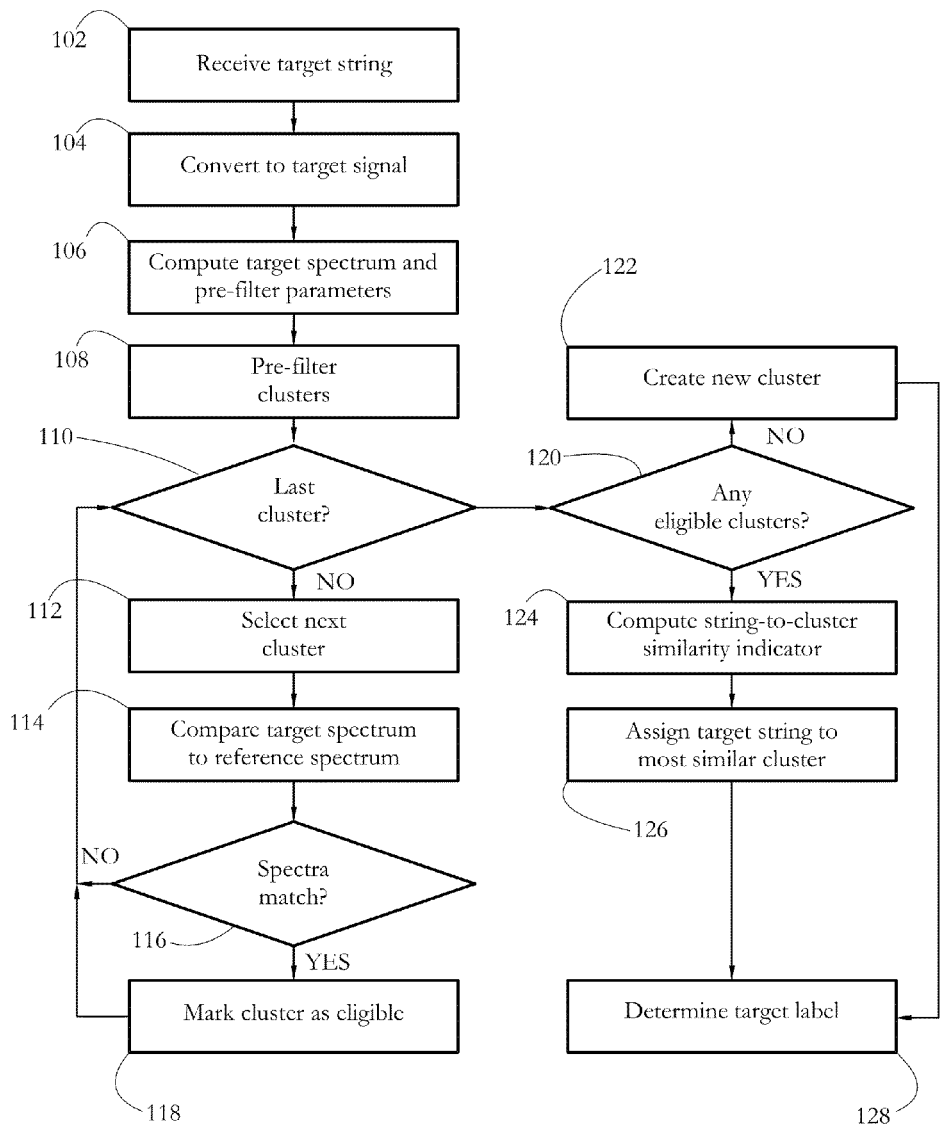
FIG. 9 shows an exemplary sequence of steps performed by the spam detector of FIG. 7 according to some embodiments of the present invention.

FIG. 9 shows an exemplary sequence of steps performed by spam detector 32 (FIG. 7) within a spam-detection transaction, according to some embodiments of the present invention. In a step 102, spam detector 32 receives target indicator 40 from client system 14 or content server 12, via communication manager 34. Next, in a step 104, spam detector 32 extracts target string 42 according to target indicator 40, and computes target signal 52 by, e.g., sequencing the ASCII codes of target string 42.

A step 106 determines frequency spectrum 60 of target signal 52 (see FIG. 6). Step 106 may also comprise the computation of several parameters of target string 42, such as string length and/or number of distinct characters, which are used to pre-filter the collection of message clusters in a step 108. In some embodiments, target signal 52 is zero-padded to a length equal to the next power of 2 (e.g. for a target string of length 243, the target signal will be padded to length 256). In some embodiments, spam detector 32 also applies a digital filter to target signal 52. Exemplary digital filters include a low-pass and/or a high-pass filter.

In some embodiments, in step 108, spam detector 32 performs a pre-filtering operation to select, according to a set of pre-filtering criteria, a subset of candidate clusters from the complete collection maintained by clustering engine 38. By selecting only a (small) subset of clusters with which to perform spectrum comparisons, spam detector 32 may effectively reduce computational costs.

In some embodiments, spam detector 32 may use string length as a pre-filtering criterion for selecting candidate clusters. The string length of target string 42 is compared to the string length of a representative of each cluster (or to an average string length of members of the respective cluster). A cluster may be selected as a candidate for spectrum comparison when its typical string length is within a predetermined threshold of the string length of target string 42.

An alternative pre-filtering criterion is the number (count) of distinct characters. For example: the string "Mississippi" has 4 distinct characters: M, i, s, and p. For each cluster, the number of distinct characters of target string 42 is compared to the number of distinct characters of a representative member of the respective cluster, or to an average number of distinct characters of the members of a cluster; clusters having similar numbers of distinct characters as target string 42 are selected as candidates for spectrum comparison.

In some embodiments, a pre-filtering criterion comprises computing a spectrum score as a function of:

$$S = \sum_i A_i, \quad [1]$$

wherein i indexes the frequencies, and $A_i$ denotes the amplitude (or power) of the Fourier spectrum of the respective string at frequency i. For each cluster, the spectrum score [1] of target string 42 is compared to the spectrum score of a representative member of the respective cluster, or to an average string score of the cluster; clusters having similar spectrum scores as target string 42 are selected as candidates for spectrum comparison.

In some embodiments, pre-filtering criteria may be combined. For example, a first subset of clusters may be selected, wherein each cluster has a similar string length to target string 42; then, out of the first subset of clusters, a second subset is selected according to spectrum score similarity.

Having selected a set of candidates for spectrum comparison, for each selected cluster, spam detector 32 may instruct spectrum manager 36 to selectively retrieve from anti-spam database 30 a reference spectrum 64 corresponding to a representative message of the respective cluster. Then, a loop sequence of steps 110-118 is executed for each selected cluster. In a step 110, spam detector 32 may verify whether all selected clusters were already considered for comparison. If yes, spam detector 32 proceeds to a step 120 described below. If no, in a step 112, the next cluster is evaluated. In a step 114, target spectrum 60 is compared to reference spectrum 64 representative of the respective cluster.

Step 114 comprises performing a comparison between target spectrum 60 and reference spectrum 64. In some embodiments, the comparison includes computing an inter-string distance by comparing the amplitudes of the respective spectra at a selected set of frequencies. For example, $$D(T, R) = \sum_{i \in S} |A_i^T - A_i^R|^\alpha, \quad [2]$$

wherein i indexes the frequency, $A_i^T$ denotes the amplitude of the target spectrum at frequency i, $A_i^R$ denotes the amplitude of the reference spectrum at frequency i, and α is a positive constant (e.g., α=1). In some embodiments, all frequency spectra corresponding to members of the same cluster have the same frequency scale, so formula [2] indeed compares frequency components of T and R computed for the same frequency i. When strings which are compared do not have the exact same string length (which would result in the two corresponding spectra having different frequency scales), in some embodiments, the signals associated to the respective strings may be zero-padded to a string length equal to the next power of 2.

The set S denotes a subset of frequencies of the spectrum. In some embodiments, S consists of just one frequency. For example, when S={i|f=0}, formula [2] only compares the amplitudes of the two spectra at zero frequency. In another example, S={i|$A_i^T = A_{max}^T$}, i.e. formula [2] only compares the amplitudes of the two spectra at a frequency i corresponding to the maximum amplitude $A_{max}^T$ of the target spectrum. In some embodiments, S denotes the set of all frequencies of the spectrum.

A step 116 (FIG. 9) determines whether target spectrum 60 matches reference spectrum 64. In some embodiments, a spectrum match requires that an inter-string distance be smaller than a predetermined threshold, D(T,R)<t. Threshold values t may be independent of the strings being compared, or may vary according to the string length and/or to the number of distinct characters of target string 42. In some embodiments, higher threshold values are used for comparatively longer strings, or strings with comparatively larger number of distinct characters.

When a match between spectra 60 and 64 is found, spam detector 32 proceeds to a step 118, in which the respective message cluster is marked as eligible to receive target string 42. If spectra do not match, spam detector 32 returns to step 110. When all message clusters selected in step 106 have been evaluated by spectrum comparison, a step 120 determines whether any clusters are eligible for receiving target string 42. If yes, in a step 124 spam detector 32 may compute, for each eligible cluster, a string-to-cluster similarity indicator indicative of how similar target string 42 is to all members of the respective cluster. An exemplary string-to-cluster similarity indicator of each eligible cluster comprises the fraction of cluster members having reference spectra 64 matching target spectrum 60.

Next, a step 126 carries out the actual assignment of target string 42 to the message cluster to which it is most similar. In some embodiments, target string 42 is assigned to the cluster with the highest string-to-cluster similarity indicator, determined in step 124. Clustering engine 38 may update cluster assignment data to reflect the addition of a new cluster member, and a record of target string 42 may be introduced in anti-spam database 30. In some embodiments, step 126 further includes the determination of a set of spam-identifying parameters associated to the cluster receiving the target message. For example, some embodiments may compute a time interval elapsed between successive timestamps, within the same cluster. Such parameters may be saved in relation to each cluster, and may be used to determine automatically (without the supervision of a human operator) whether a particular cluster includes spam or legitimate messages, or whether a particular cluster is likely to represent a spam wave.

When no clusters were found eligible to receive the target string (step 120), indicating that target string 42 is likely to be distinct from any already stored in anti-spam database, in a step 122 clustering engine 38 may create a new cluster with the target string as the sole member, and may save a record of the target string into anti-spam database 30.

In a step 128, spam detector 32 may determine target label 50 identifying the target communication as spam or legitimate. In some embodiments, the decision whether the target communication is spam is made according to the cluster assignment of target string 42. When string 42 is assigned to a cluster consisting mainly of spam messages, then the target message may receive a spam label as well.

In some embodiments, label 50 is determined according to certain spam-identifying features of the members of the cluster that the target message was assigned to. One such spam-identifying feature is timestamp 48. The assignment of numerous new members in a short time interval may be an indication that the respective cluster consists of a wave of spam messages. In some embodiments, spam detector 32 may determine a time interval elapsed between a plurality of timestamps associated to members of a cluster, e.g. the shortest time interval within which 6 members where assigned to that cluster, and when the time interval drops below a predetermined threshold, mark the respective cluster as spam.

The exemplary systems and methods described above allow an anti-spam system to detect unsolicited communication in the form of user-generated content on the Internet in the form of blog comments, comments posted on social network sites, etc., and also in the form of email messages, instant messages, and phone text and multimedia messages.

In some embodiments, a computer system extracts a target string of characters from an electronic communication such as a blog comment, transmits it to an anti-spam server, and receives an indicator of whether the respective electronic communication is spam or non-spam from the anti-spam server. When the electronic communication is spam, the computer system may block, quarantine, erase, or in any other way restrict the display of the electronic communication and/or may issue a warning to the user.

The anti-spam server determines whether the electronic communication is spam or non-spam according to a frequency representation of a target character string extracted from the electronic communication. The target string is transformed into a signal, such as a sequence of numbers, and a target spectrum of the signal is computed and compared against a corpus of reference spectra, to find a match for the target spectrum. Some embodiments of the present invention exploit the observation that two similar strings always have similar frequency spectra. Therefore, finding a match between the spectrum of the target string and another spectrum computed for a reference string may be an indication that the target string is similar to the reference string. In such a case, the anti-spam server may then determine whether the electronic communication is spam according to whether the reference string is indicative of spam, e.g., whether the reference string belongs to a cluster of electronic communications labeled as spam.

However, there are many situations in which two distinct strings have very similar spectra. To avoid a false positive identification, other features of the target string, such as a timestamp, may be considered when making a decision whether two strings are similar.

Spectrum comparison may not be a reliable method of identifying similar strings when string length exceeds a certain threshold. In the limit of very long strings all strings have similar spectra, which resemble white noise spectra. Therefore, the systems and methods described here are particularly suited to analyze short strings, appearing in electronic communications such as blog posts and comments on social networking sites such as Facebook® and Twitter®.

An additional problem for spam detection by string comparison is obfuscation, in which spammers may replace certain characters in a message with other characters (e.g., Vi4gra), to avoid detection. String obfuscation may be addressed by applying a digital filter, with either high-pass or low-pass characteristics, to the target signal. Obfuscating characters may be regarded as "noise"; filtering may reduce the inter-string distance between two obfuscated versions of the same string, making the two strings appear more similar.

Some embodiments of the present invention organize the corpus into a plurality of clusters, each cluster of records consisting of similar strings. Instead of performing spectrum comparisons over all records of the corpus, clustering allows the methods and systems described here to compare the target string to only one representative target string per cluster, thus significantly reducing computational costs.

Clustering may also facilitate automatic (unsupervised) spam detection. As opposed to conventional clustering methods, wherein message classification is commonly achieved through a process of supervised training, e.g. on a training corpus previously sorted into a plurality of pre-determined message classes, some embodiments of the present invention perform a dynamic clustering, without prior knowledge of the spam status (spam vs. non-spam) of clusters or messages. A cluster may be automatically identified as representing spam when it accumulates a certain number of members in a short time interval.

In a computer experiment, a corpus of 22,000 blog comments was classified into clusters according to some embodiments of the present invention. Calculations were carried out on a computer system equipped with a Pentium 4 processor at 3 GHz and 1.5 GB of RAM, running the Ubuntu OS 10.04. Classification took approximately 9:30 minutes of computation time, producing 1,652 message clusters with more than one cluster member (averaging 4.59 comments per cluster). By comparison, a conventional clustering system employing a hash-based string matching algorithm and executing on the same hardware platform, produced 1,617 clusters with more than one member in 7:07 minutes of computation time, with an average of 4.26 comments per cluster.

FIGS. 10A-E show results of another computer experiment, performed with a collection of test strings ranging in string length from 25 to 3000 characters. The hardware configuration was the same as above. FIG. 10-A shows the time taken to map strings into signals, as a function of the string length of the test strings. The computation time per signal varied from a few microseconds to approximately one half of a millisecond, with approximately linear correlation between time and string length.

FIGS. 10-B-C-D show the time taken to compute frequency spectra of the test strings, for a range of string lengths. FIG. 10-E shows the time taken to calculate an inter-string distance according to spectrum comparison (e.g. formula [2]), as a function of string length of the test strings. Computation time ranged from a few microseconds to around 500 microseconds.

Figure 11:
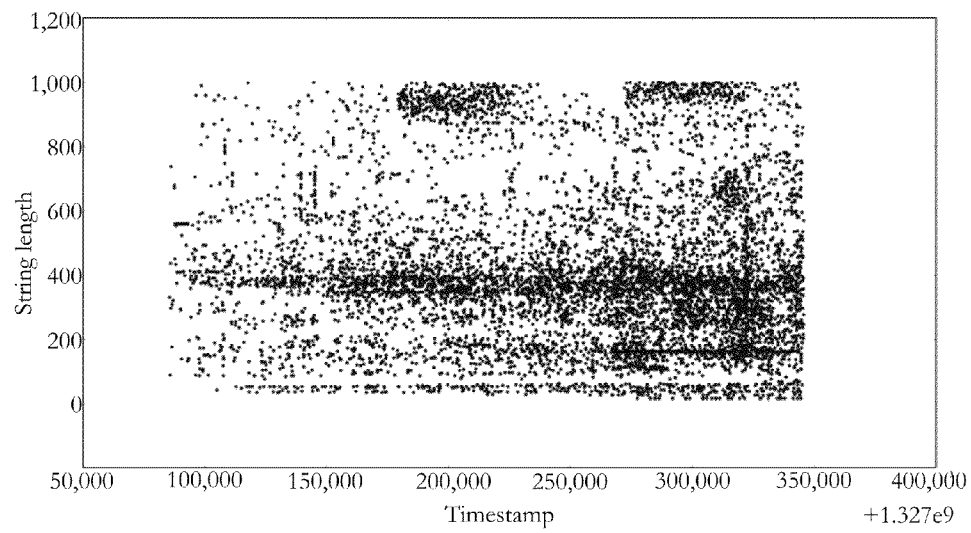
FIG. 11 shows a plot of string length versus a timestamp indicator, for a collection of real blog comments, comprising both spam and non-spam.
Figure 12:
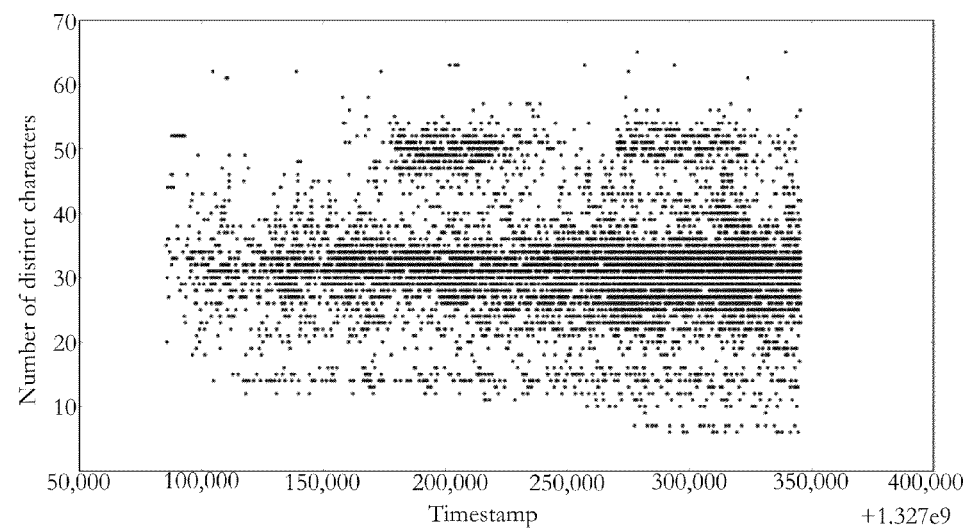
FIG. 12 shows a plot of a number of distinct characters versus a timestamp indicator, for a collection of real blog comments, comprising both spam and non-spam.

FIG. 11 shows string length plotted versus a timestamp indicator, for a collection of 8676 real blog comments, comprising both spam and non-spam. FIG. 12 shows the number of distinct characters, plotted versus a timestamp indicator, for another collection of 5351 real blog comments, comprising both spam and non-spam. Both FIGS. 11 and 12 indicate a clustering of spam messages according to the timestamp, allowing automatic spam identification as described above.

It will be clear to one skilled in the art that the above embodiments may be altered in many ways without departing from the scope of the invention. Accordingly, the scope of the invention should be determined by the following claims and their legal equivalents.

What is claimed is:

1. A method comprising:
  employing at least one processor of a computer system to receive a target string forming a part of an electronic communication;
  employing the at least one processor to process the target string into a target signal consisting of a sequence of numbers, wherein each character of the target string is mapped to a number of the sequence of numbers;
  in response to receiving the target string, employing the at least one processor to determine a string eligibility criterion according to the target string;
  employing the at least one processor to pre-filter a corpus of reference strings according to the string eligibility criterion, to produce a plurality of candidate strings;
  in response to selecting the candidate strings, employing the at least one processor to perform a comparison between a frequency spectrum of the target signal and a frequency spectrum determined for a candidate string of the plurality of candidate strings, wherein determining the frequency spectrum of the target signal comprises applying a Fourier transform to the target signal to represent the target signal as a plurality of frequency components of the target signal, each frequency component having a distinct frequency and an amplitude determined for the distinct frequency; and employing the at least one processor to determine whether the electronic communication is spam or non-spam according to a result of the comparison.

2. The method of claim 1, further comprising determining whether the electronic communication is spam or non-spam according to a comparison between a timestamp of the target string and a timestamp of the candidate string.

3. The method of claim 1, wherein the corpus of reference strings comprises a plurality of clusters, each cluster including a set of similar strings, wherein each candidate string of the plurality of candidate strings is representative of a distinct cluster, and wherein the method further comprises, in response to performing the comparison, employing the at least one processor to select a cluster from the plurality of clusters and to assign the target string to the selected cluster.

4. The method of claim 3, further comprising determining whether the target communication is spam or non-spam according to a plurality of timestamps, each timestamp of the plurality of timestamps corresponding to a member of the selected cluster.

5. The method of claim 3, further comprising:
in response to assigning the target string to the selected cluster, determining a count of cluster members of the selected cluster; and
determining whether the target communication is spam or non-spam according to the count of cluster members.

6. The method of claim 3, further comprising identifying the target communication as belonging to a selected spam wave according to the selected cluster.

7. The method of claim 1, wherein pre-filtering the corpus comprises:
determining a first string length of the target string and a second string length of a reference string of the corpus, and
when the first string length differs from the second string length by an amount smaller than a predetermined threshold, adding the reference string to the set of candidate strings.

8. The method of claim 1, wherein pre-filtering the corpus comprises:
determining a first spectrum score of the target string as a function of:

$$S = \sum_i A_i$$

wherein $A_i$ denotes an amplitude of a frequency component of the target signal, the frequency component having frequency i;
determining a second spectrum score of a reference string of the corpus; and
when the first spectrum score differs from the second spectrum score by an amount smaller than a predetermined threshold, adding the reference string to the set of candidate strings.

9. The method of claim 1, wherein performing the comparison comprises determining an inter-string distance as a function of:

$$\sum_{i \in S} |A_i^T - A_i^C|^\alpha,$$

wherein S denotes a subset of frequencies, $A_i^T$ denotes an amplitude of a frequency component of the target signal with frequency i, $A_i^C$ denotes an amplitude of a frequency component determined for the candidate string at frequency i, and wherein $\alpha$ is a positive constant.

10. The method of claim 9, wherein the subset S consists exclusively of a frequency equal to zero.

11. The method of claim 9, wherein the subset S consists exclusively of a frequency of a frequency component having the largest amplitude among the plurality of frequency components of the target signal.

12. The method of claim 1, further comprising, in response to processing the target string into a target signal, employing the at least one processor to apply a digital low-pass filter to the target signal, and wherein the frequency spectrum of the target signal comprises a frequency spectrum of the filtered target signal.

13. The method of claim 1, further comprising, in response to processing the target string into a target signal, employing the at least one processor to apply a digital high-pass filter to the target signal, and wherein the frequency spectrum of the target signal comprises a frequency spectrum of the filtered target signal.

14. A computer system comprising at least one processor programmed to:
receive a target string forming a part of an electronic communication;
process the target string into a target signal consisting of a sequence of numbers, wherein each character of the target string is mapped to a number of the sequence of numbers;
in response to receiving the target string, determine a string eligibility criterion according to the target string;
pre-filter a corpus of reference strings according to the string eligibility criterion, to produce a plurality of candidate strings;
in response to selecting the candidate strings, perform a comparison between a frequency spectrum of the target signal and a frequency spectrum determined for a candidate string of the plurality of candidate strings, wherein determining the frequency spectrum to the target signal comprises applying a Fourier transform to the target signal to represent the target signal as a plurality of frequency components of the target signal, each frequency component having a distinct frequency and an amplitude determined for the distinct frequency; and
determine whether the electronic communication is spam or non-spam according to a result of the comparison.

15. The system of claim 14, wherein the at least one processor is further programmed to determine whether the electronic communication is spam or non-spam according to a comparison between a timestamp of the target string and a timestamp of the candidate string.

16. The system of claim 14, wherein the corpus of reference strings comprises a plurality of clusters, each cluster including a set of similar strings, wherein each candidate string of the plurality of candidate strings is representative of a distinct cluster, and wherein the at least one processor is further programmed, in response to performing the comparison, to select a cluster from the plurality of clusters and to assign the target string to the selected cluster.

17. The system of claim 16, further comprising determining whether the target communication is spam or non-spam according to a plurality of timestamps, each timestamp of the plurality of timestamps corresponding to a member of the selected cluster.

18. The system of claim 16, wherein the at least one processor is further programmed to:
   in response to assigning the target string to the selected cluster, determine a count of cluster members of the selected cluster; and
   determine whether the target communication is spam or non-spam according to the count of cluster members.

19. The system of claim 16, wherein the at least one processor is further programmed to identify the target communication as belonging to a selected spam wave according to the selected cluster.

20. The system of claim 14, wherein pre-filtering the corpus comprises:
   determining a first string length of the target string and a second string length of a reference string of the corpus, and
   when the first string length differs from the second string length by an amount smaller than a predetermined threshold, adding the reference string to the set of candidate strings.

21. The system of claim 14, wherein pre-filtering the corpus comprises:
   determining a first spectrum score of the target string as a function of:

$$S = \sum_i A_i,$$

wherein $A_i$ denotes an amplitude of a frequency component of the target signal, the frequency component having frequency i;
   determining a second spectrum score for a reference string of the corpus; and
   when the first spectrum score differs from the second spectrum score by an amount smaller than a predetermined threshold, adding the reference string to the set of candidate strings.

22. The system of claim 14, wherein performing the comparison comprises determining an inter-string distance as a function of:

$$\sum_{i \in S} |A_i^T - A_i^C|^\alpha,$$

wherein S denotes a subset of frequencies, $A_i^T$ denotes an amplitude of a frequency component of the target signal having frequency i, $A_i^C$ denotes an amplitude of a frequency component determined for the candidate string at frequency i, and wherein $\alpha$ is a positive constant.

23. The system of claim 22, wherein the subset S consists exclusively of a frequency equal to zero.

24. The system of claim 22, wherein the subset S consists exclusively of a frequency of a frequency component having the largest amplitude among the plurality of frequency components of the target signal.

25. The system of claim 14, wherein the at least one processor is further programmed, in response to processing the target string into a target signal, to apply a digital low-pass filter to the target signal, and wherein the frequency spectrum of the target signal comprises a frequency spectrum of the filtered target signal.

26. The system of claim 14, wherein the at least one processor is further programmed, in response to processing the target string into a target signal, to apply a digital high-pass filter to the target signal, and wherein the frequency spectrum of the target signal comprises a frequency spectrum of the filtered target signal.

27. A method comprising:
   employing at least one processor of a computer system to receive an electronic communication;
   in response to receiving the electronic communication, employing the at least one processor to extract a target string from the electronic communication;
   employing the at least one processor to transmit the target string to an anti-spam server; and
   in response to transmitting the target string, receiving a target label indicative of whether the electronic communication is spam or non-spam, wherein the target label is determined at the anti-spam server and wherein determining the target label comprises:
      employing the anti-spam server to process the target string of characters into a target signal consisting of a sequence of numbers, wherein each character of the target string is mapped to a number of the sequence of numbers;
      employing the anti-spam server to determine an eligibility criterion according to the target string;
      employing the anti-spam server to pre-filter a corpus of reference strings according to the eligibility criterion, to produce a plurality of candidate strings;
      in response to selecting the candidate strings, employing the anti-spam server to employing the computer system to perform a comparison between a frequency spectrum of the target signal and a frequency spectrum determined for a candidate string of the plurality of candidate strings, wherein determining the frequency spectrum of the target signal comprises applying a Fourier transform to the target signal to represent the target signal as a plurality of frequency components of the target signal, each frequency component having a distinct frequency and an amplitude determined for the distinct frequency; and
      employing the anti-spam server to determine whether the electronic communication is spam or non-spam according to a result of the comparison.

28. A method comprising:
   employing at least one processor of a computer system to receive a target string forming a part of an electronic communication;
   employing the at least one processor to process the target string into a target signal consisting of a sequence of numbers, wherein each character of the target string is mapped to a number of the sequence of numbers;
   in response to receiving the target string, employing the at least one processor to determine a string eligibility criterion according to the target string;
   employing the at least one processor to pre-filter a corpus of reference strings according to the string eligibility criterion, to produce a plurality of candidate strings;
   in response to selecting the candidate strings, employing the at least one processor to determine an inter-string distance separating the target string from a candidate string of the plurality of candidate strings, the inter-string distance determined according to a first amplitude of a frequency spectrum of the target signal and according to a second amplitude of a frequency spectrum determined for the candidate string, wherein determining the frequency spectrum of the target signal comprises applying a Fourier transform to the target signal to represent the target signal as a plurality of frequency components of the target signal, each frequency component having a distinct frequency and an amplitude determined for the distinct frequency; and employing the at least one processor to determine whether the target communication is spam or non-spam according to the inter-string distance.

29. A method comprising:

employing at least one processor of a computer system to receive a target string forming a part of an electronic communication;

employing the at least one processor to process the target string into a target signal consisting of a sequence of numbers, wherein each character of the target string is mapped to a number of the sequence of numbers;

employing the at least one processor to perform a comparison between a frequency spectrum of the target signal and a frequency spectrum determined for a reference string selected from a set of reference strings, wherein determining the frequency spectrum of the target signal comprises applying a Fourier transform to the target signal to represent the target signal as a plurality of frequency components of the target signal, each frequency component having a distinct frequency and an amplitude determined for the distinct frequency; and employing the at least one processor to determine whether the target communication is spam or non-spam according to a result of the comparison.

* * * * *